(12) United States Patent
Vanterpool

(10) Patent No.: US 10,882,479 B2
(45) Date of Patent: Jan. 5, 2021

(54) COLLISION PREVENTION SYSTEM

(71) Applicant: TOYOTA MOTOR ENGINEERING & MANUFACTURING NORTH AMERICA, INC., Plano, TX (US)

(72) Inventor: Monica Andrea Vanterpool, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 197 days.

(21) Appl. No.: 16/129,035

(22) Filed: Sep. 12, 2018

(65) Prior Publication Data

US 2020/0079308 A1 Mar. 12, 2020

(51) Int. Cl.
| | |
|---|---|
| *B60R 19/18* | (2006.01) |
| *B60R 19/48* | (2006.01) |
| *B60W 30/09* | (2012.01) |
| *G08G 1/16* | (2006.01) |
| *B60R 22/28* | (2006.01) |

(52) U.S. Cl.
CPC ............ *B60R 19/18* (2013.01); *B60R 19/483* (2013.01); *B60R 22/28* (2013.01); *B60W 30/09* (2013.01); *G08G 1/161* (2013.01); *G08G 1/164* (2013.01); *G08G 1/166* (2013.01); *B60R 2019/186* (2013.01); *B60R 2022/284* (2013.01)

(58) Field of Classification Search
CPC ....... B60R 19/18; B60R 19/483; B60R 22/28; B60W 30/09; G08G 1/161; G08G 1/164
See application file for complete search history.

(56) References Cited

U.S. PATENT DOCUMENTS

| | | |
|---|---|---|
| 6,565,147 B1 | 5/2003 | Beals, Jr. |
| 9,776,584 B1 * | 10/2017 | Sute ...................... G08G 1/162 |
| 2009/0009603 A1 | 1/2009 | Kim |
| 2010/0114467 A1 | 5/2010 | Samuel |

FOREIGN PATENT DOCUMENTS

| | | |
|---|---|---|
| CN | 2832601 Y | 11/2006 |
| KR | 20040040771 | 5/2004 |
| KR | 100854473 | 8/2008 |

\* cited by examiner

*Primary Examiner* — Michael D Lang
(74) *Attorney, Agent, or Firm* — Sheppard, Mullin, Richter & Hampton LLP; Hector A. Agdeppa; Daniel N. Yannuzzi

(57) ABSTRACT

Systems and methods of automatically controlling the application of a magnetic field based on certain sensed conditions and/or environmental considerations are provided. Sensed conditions may be vehicle operational characteristics and environmental considerations may be from V2X communications, which may be utilized to determine the current vehicle speed and the distance between a vehicle and an obstacle. When speed and distance meet certain thresholds, the magnetic components present on front, rear, and/or side panels of the vehicle may be activated to prevent or mitigate collision impact. The magnetic components may be activated with a determined amount of current for a specific repel force.

15 Claims, 5 Drawing Sheets

COLLISION PREVENTION SYSTEM

TECHNICAL FIELD

Various embodiments relate to controlling the application of a magnetic field based on certain sensed conditions and/or environmental considerations.

DESCRIPTION OF RELATED ART

Motor vehicle incidents are most commonly caused by a lack of attention on the part of the driver. Minor collisions most likely occur during low speed traffic and situations during which a vehicle decelerates, times when drivers are distracted the most. Although the rear section of vehicles include brake lights to indicate when vehicles are braking and decelerating, there may be situations when the brake lights are not visible or the driver does not react quickly enough. Most vehicle bumpers today are composed of fiberglass composite, steel, and aluminum with a plastic cover. While bumpers may be able to alleviate the impact of a minor collision, they can be damaged easily and costly to repair.

BRIEF SUMMARY OF EMBODIMENTS

In accordance with embodiments of the technology disclosed herein, a computer-implemented method comprises determining the current speed of a vehicle, location of the vehicle, roadway conditions, and the distance between the vehicle and an obstacle where the obstacle can be another vehicle. Upon a determination that the speed is below a speed threshold at a certain location, which may be an indication of slow traffic, one or more magnetic components may be activated with a magnetic field of a determined strength. Upon a determination that the distance between two vehicles is below a threshold, one or more magnetic components may also be activated with a magnetic field of a determined strength. Upon a determination of roadway conditions ahead on the path traveled by the vehicle, one or more magnetic components may be activated or deactivated. Upon a determination that the current speed is maintained within a range, one or more magnetic components may be deactivated as there is no need for them. An impact damping material may surround the magnetic components, reducing impact damage in the event of a collision. Moreover, even where activation of the magnetic components is unable to prevent a collision, collision mitigation may still occur from partial polarity rejection.

In some embodiments, determining the speed of the vehicle and the distance between two vehicles comprises utilizing data from a plurality of onboard sensors. Onboard sensors may be used alone, in combination, or in conjunction with vehicle-to-vehicle (V2V) and vehicle-to-infrastructure (V2I) communications. In some embodiments, roadway condition information received in real- or near-real time via vehicle-to-infrastructure communications may alter the speed threshold.

In some embodiments, the speed threshold comprises an absolute speed value. In some embodiments, the speed threshold comprises a relative speed differential between a speed at which the vehicle is traveling and speed of neighboring traffic or a current speed limit of a roadway on which the vehicle is traveling.

In some embodiments, determining a distance between two vehicles comprises determining exact locations of both vehicles. Based on coordinate locations, the distance may be calculated. In some embodiments, distance between two vehicles comprises using imaging sensors operatively attached to the rear and front of the vehicle on or near the bumpers. As mentioned, the determined distance may indicate whether or not to activate the one or more magnetic components and with what magnetic field strength.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any embodiments described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
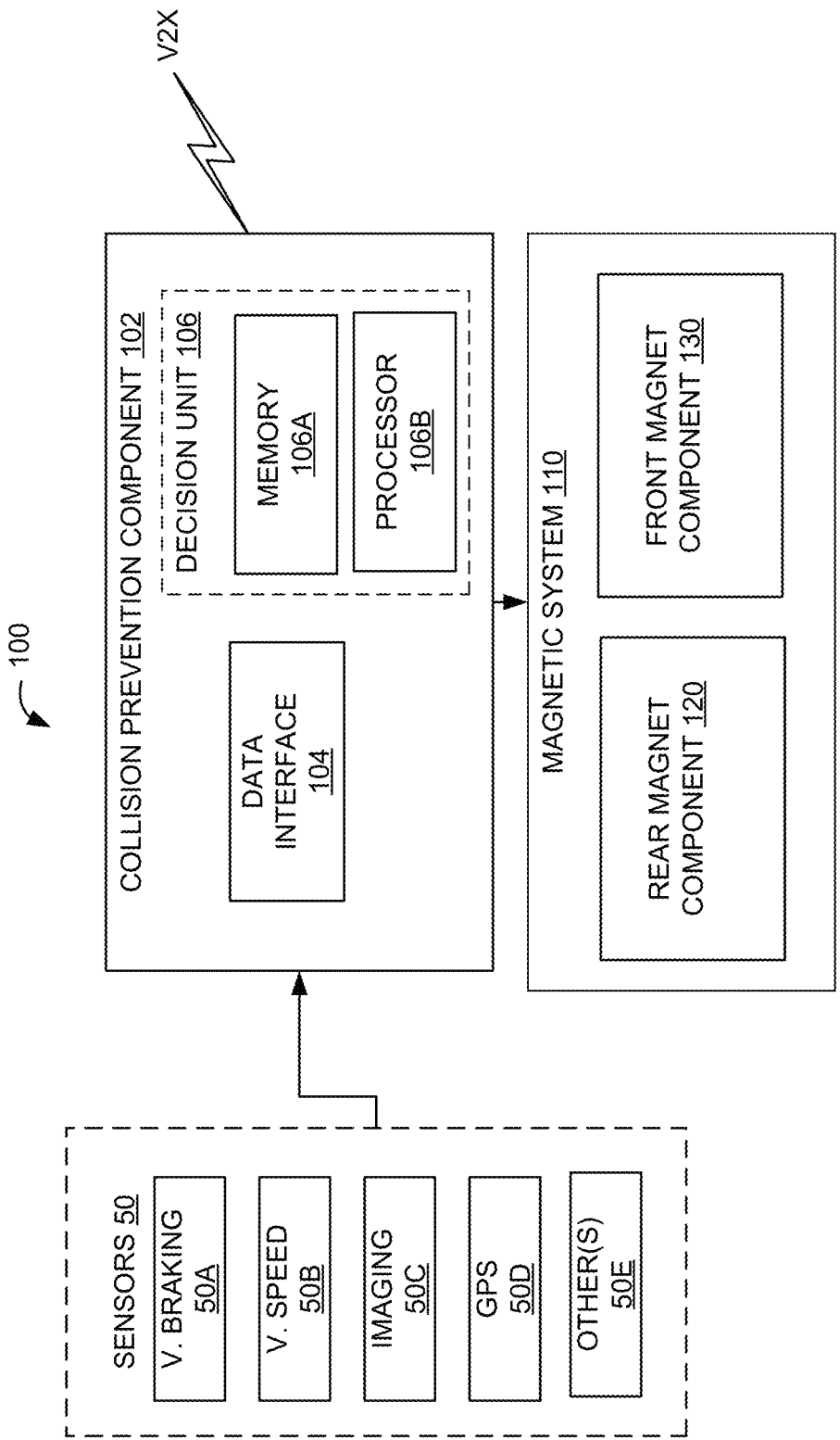
FIG. 1 illustrates an example architecture in accordance with various embodiments of the technology disclosed herein for implementing automatic collision prevention magnetic components in a vehicle environment.

The figures are not intended to be exhaustive or to limit the invention to the precise form disclosed. It should be understood that the technology disclosed herein can be practiced with modification and alteration, and that the disclosed technology be limited only by the claims and the equivalents thereof.

DETAILED DESCRIPTION OF THE EMBODIMENTS

Embodiments of the technology disclosed herein are directed to systems and methods for automatically activating or deactivating magnetic component(s). In some embodiments, such magnetic components may be present on a front bumper, rear bumper, and/or side panel(s) of a vehicle. In some embodiments, impact damping materials may surround such magnetic components. In this way, if a low impact collision is predicted to occur or has the potential to occur, the magnetic component(s) can be activated to repel an opposing obstacle to avoid the collision altogether or, at the least, mitigate the effects of the collision (in conjunction with impact dampening material in various embodiments). The automatic operation of a vehicle's magnetic component(s) can be dependent on first data that represents operational characteristics of the vehicle and/or second data that represents roadway conditions the vehicle may encounter or is encountering. In a circumstance where the magnetic components do not activate in time to prevent the collision, the collision may still be mitigated in that partial polarity rejection may have occurred (in addition to any impact dampening material included). Magnetic component(s) can include electromagnets, permanent magnets that are actuated, temporary magnets to which a magnetic field can be applied, and the like.

Non-limiting operational characteristics (i.e., first data) include vehicle speed, vehicle braking frequency, and distance between the vehicle and an obstacle. Further examples of operational conditions include, but are not limited to: engine RPM; torque output; motor rotation; tire conditions (e.g., tire pressure, tire wear); among other operational characteristics. In various embodiments, the operational characteristics can be determined by one or more sensors adapted to determine the vehicle's operating conditions. Distance between the vehicle and an obstacle can be determined by imaging sensors, such as cameras. An obstacle can be an object in the road, another vehicle, or any other obstruction in the roadway.

In addition to one or more sensors, operational characteristics (e.g., vehicle speed) can also be determined through location-based (e.g., GPS) methods and/or calculations. Both location-based methods and one or more sensors can be used in combination in some embodiments. In such situations, operational characteristics determined by each source may be compared.

Second data representing roadway conditions can include current traffic conditions, obstacles, road feature quality information, or conditions of, on, or near a roadway. Roadway conditions can be determined by communicating with other vehicles through V2V communications or by roadway infrastructure through V2I communications (collectively, "V2X communications"). Examples of current traffic conditions include, but are not limited to: road feature quality information; construction zone information; daily traffic conditions; and seasonal traffic conditions communicated through V2X communications; among others. Such current traffic conditions can be derived from external agencies, e.g. Caltrans, SigAlert, National Weather Service, etc. Distance between the vehicle and an obstacle, e.g. another vehicle, can also be determined and communicated through V2V communications. For example, vehicles can communicate relative distance between each other. Examples of obstacles include, but are not limited to: other vehicles; road debris; animals; pedestrians.

One type of determination that can be performed is calculating the distance between two objects. For example, the distance between a vehicle and an obstacle can also be obtained from sensors as well as V2V communications. Such distances may be compared against predetermined thresholds, depending on the method with which the distance was obtained. For example, where the distance is obtained through imaging sensors, the distance can be compared to a first threshold. In various embodiments, the first threshold may be determined based on one or more of calibration information for the sensors, vehicle specifications, and regulatory data, among other types of data. The first threshold may be set at the factory. The first threshold may also be stored in memory. In other embodiments, the determination may include logic and/or circuitry to determine the first threshold on-the-fly based on data collected from the various sensors. For example, determining distance between the vehicle and another vehicle could utilize data including, but not limited to, tire pressures and wear, engine speed, brake conditions, on-vehicle calibration data, and other data to recalculate the first threshold during operation.

Where the distance is obtained through V2V communications, the distance can be compared to a second threshold. Like the first threshold, the second threshold may be determined based on a variety of data, including data related to the V2V communications components utilized in the environment. Both distances can be compared to the respective threshold and again against each other for validation.

In conjunction with the determined distance comparisons, analysis of the first data and the second data can determined whether or not to activate the magnetic component(s), when to active the magnetic component(s), and with what magnetic field strength. Comparisons of one or more operational characteristics and roadway conditions to a plurality of thresholds can be performed by a processor. For example, slow vehicle speed determined by a speed sensor coupled with a short distance between the vehicle and a preceding vehicle determined from V2V suggests there is stop-go traffic, a time where a low impact collision is likely to occur, and magnetic component(s) should be activated immediately with a moderate magnetic field. Moderate magnetic field or other magnetic field strengths are related to how much electric current is injected into the magnetic component(s). In another example, a sensed acceleration determined by a speed sensor and/or other sensors coupled with a large distance between the vehicle and a preceding vehicle can indicate a time where a low impact collision is not likely to occur. Accordingly, and the magnetic component(s) can be deactivated.

FIG. 1 is a diagram illustrating an example of a collision prevention system 100 of a vehicle in accordance with the technology of the present disclosure. As illustrated in FIG. 1, system 100 includes a collision prevention component 102, a plurality of sensors 50A-E, and a plurality of magnetic system 110. Sensors 50A-E and magnetic system 110 can communicate with collision prevention component 102 via a wired or wireless communication interface. Although sensors 50A-E and magnetic system 110 are depicted as communicating with collision prevention component 102, in some embodiments these components can also communicate with each other.

In some embodiments, collision prevention component 102 includes a data interface 104 and a decision unit 106. Components of collision prevention component 102 may communicate with each other. In some embodiments, the decision unit 106 may include a memory 106A and processor 106B.

Memory 106A, can be made up of one or more modules of one or more different types of memory, and may be configured to store data and other information as well as operational instructions that may be used by the processor 106B to control collision prevention component 102. Processor 106B may be a GPU, CPU, microprocessor, or any other suitable processing system. The memory 106A may include one or more various forms of memory or data storage (e.g., flash, RAM, etc.) that may be used to store the calibration parameters, images (analysis or historic), point parameters, instructions and variables for processor 106B as well as any other suitable information.

In various embodiments, decision unit 106 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a collision prevention component 102.

Data interface 104 can be either a wireless communications/processing interface or a wired communications/processing interface with an associated hardwired data port (not illustrated). As this example illustrates, communications within collision prevention component 102 can include either or both wired and wireless communications. A wireless data interface can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise.

A wired data interface can include a transmitter and a receiver (not shown) for hardwired communications with other devices, e.g., a hardwired interface to other components, including sensors 50A-E and magnetic system 110. A wired data interface can communicate with other devices using Ethernet or any of a number of other wired communication protocols whether standardized, proprietary, open, point-to-point, networked or otherwise.

Data interface 104 can be used to transmit and receive data between collision prevention component 102 and sensors 50A-E, as well as between collision prevention component 102 and magnetic system 110. For example, data interface 104 can be configured to receive data and other information from, e.g., vehicle braking detector sensor 50A (which may be a pressure sensor capable of sensing the time and intensity of a vehicle operator pressing on the brake). This sensor data can be used to determine whether or not a vehicle is braking. Additionally, data interface 104 can be configured to receive data and other information from, e.g., vehicle speed sensor 50B. This sensor data can be used to determine the speed of the vehicle, which in conjunction with a determination that vehicle is braking, and the determined distance between the vehicle and an obstacle, e.g. another vehicle, can be used to automatically activate the vehicle's magnetic component(s) if warranted. Additionally, data interface 104 can be used to send an activation signal or other activation information based upon an activation decision from decision unit 106 to at least one of rear magnetic component 120 and front magnetic component 130 to activate a magnetic field.

Sensors 50A-E can include one or more of the above-mentioned sensors and/or sensors capable of sensing the above-mentioned data that may be operational characteristic inputs. The operational characteristic inputs may be used in deciding whether or not to automatically activate/deactivate the magnetic system 110. It should be understood that not all the illustrated sensors are necessarily needed, and that additional sensors (other sensor(s) 50E) may be used.

In some embodiments, an imaging sensor 50C, such as a camera may be used to visually determine whether or not a second vehicle is in proximity of a vehicle. For example, a camera may be located at or near the vehicle's bumper, and configured to capture live/still images or video of the vehicle's bumper and forward those captured live/still images or video to the data interface 104 or to a display or head unit (not illustrated). In this way, if the vehicle model or existing devices permit, a driver or operator of the vehicle may visually confirm whether or not the second vehicle is proximate to the vehicle. In some embodiments imaging sensor 50C may be an infrared or other form of light sensor configured to detect an infrared or corresponding light from an emitter located on, e.g., a bumper of the second vehicle. When the second vehicle is in proximity to the vehicle, imaging sensor 50C can detect light being emitted from the emitter, thereby indicating that the second vehicle or other vehicle are proximate to the vehicle. A signal or other notification may be sent to data interface 104 to then communicate it with collision prevention component 102 or to, e.g., display or head unit (not illustrated), notifying the driver or operator of this proximity condition.

In some embodiments, other sensors may be used to provide data that can be used to determine whether to activate the magnetic system 110. For example, a vehicle speed sensor 50B may be configured to determine the speed at which a vehicle is traveling. In some embodiments, vehicle speed sensor 50B may be some sensor configured to determine the number of revolutions one or more wheels are turning over some period of time. This number of revolutions may be translated into vehicle speed through one or more known calculations that may be performed on vehicle speed sensor 50B or that may be performed by processor 106B. In some embodiments, vehicle speed sensor 50B may be a radar, sonar, or other device that uses, e.g., the Doppler effect, to determine the speed at which the vehicle is traveling. For example, a radar may be used to transmit a beam to a roadside fixed object, such as a traffic sign, and the speed of a vehicle can be determined based upon the change in frequency of the beam upon bouncing back from the roadside object. In this example, vehicle speed sensor 50B may operate in conjunction with another sensor(s), such as an imaging sensor 50C, that can be used to detect potential roadside objects at which to direct a beam.

In some embodiments, a GPS sensor (receiver) 50D may be used to determine the location of the vehicle at some point in time. Based on a subsequent location to which the vehicle has traveled and the time it took for the vehicle to traverse the distance to the subsequent location can be used to determine its speed. Again, GPS sensor/receiver 50D may have the capability to perform this speed calculation, or the locations data alone may be transmitted to processor 106B to be translated into vehicle speed data. In some embodiments GPS sensor 50D may communicate with one or more location-based systems, navigation information providers, and the like to receive location information that can ultimately be used to calculate the speed at which the vehicle is traveling. In addition, GPS sensor 50D may determine the distance between the vehicle and other proximate vehicles utilizing the coordinate locations of each respective vehicle in various embodiments through V2X communications. It should be understood that although discussed with respect to GPS systems, other types of sensors/receivers operable in other types or forms of positioning/location systems are applicable, e.g., GLONASS, GALILEO, BEIDOU, etc.

In other embodiments, as stated above, a vehicle may communicate with roadside units of V2X communications. Roadside units are devices included within the broad roadway infrastructure, used to collect and transmit data for a variety of uses. For example, a roadside unit may be a device designed to collect data regarding traffic flow through an intersection and controlling a traffic light to alleviate congestion. In accordance with the technology disclosed herein, a vehicle may communicate with roadside units to determine and/or receive information indicative of the speed at which the vehicle is traveling, current locations in which can be used to calculate distances, and roadway conditions. These V2X communications may occur between one or more roadside units and/or one or more other vehicles. They can be received directly by collision prevention component 102 or another electronic control unit or other communications component of the vehicle (and forwarded to collision prevention component 102 via data interface 104). V2X communications in conjunction with GPS sensor 50D can provide second data in which useful information, e.g. traffic conditions, road feature quality information, etc., is communicated with the vehicle from infrastructures relative to its current GPS location and direction traveling.

Decision unit 106 may receive or obtain one or more operational characteristics input as data signals through data interface 104. In some embodiments these operational characteristic inputs may be used to verify the proximity (or absence) of a second vehicle, as well as vehicle speed, and the operating characteristics of a vehicle. The operational characteristics input as well as a plurality of threshold values may be stored in memory 106A. Memory 106A may be used for "long-term" storage or, e.g., as a buffer or real-time cache used to store relevant operating conditions input that processor 106B uses to determine whether or not turn signal system 118 should be put into hazard mode.

In some embodiments, decision unit 106 may compare a determined distance between the vehicle and an obstacle. As previously mentioned, the determined distance can derived from sensors 50A-E and compared against the first threshold, and/or an additional determined distance can be derived from V2X communications and compared against the second threshold. Depending on the method the distance was derived, if its corresponding threshold is surpassed, magnetic system 110 may be activated.

In some embodiments decision unit 106 may compare two determined distances between the vehicle and an obstacle, one derived from sensors 50A-E and one derived through V2X communications. This embodiment assumes the vehicle is utilizing both sensors 50A-E and V2X communications. One or both may be translated or converted into a format in which their values can be readily compared. This comparison of two separately determined distances may calculate an average distance for validation before comparing the average distance to a third threshold. The third threshold comparison may decide whether or not to activate magnetic system 110.

In some embodiments, decision unit 106 may compare expected vehicle speed when the vehicle is traveling in a specific area (thus utilizing GPS sensor 50D) from memory 106A, which may further include a data store, such as a table, to the actual vehicle speed. In this way, if the actual vehicle speed is not consistent with the expected vehicle speed, magnetic system 110 may be activated or deactivated accordingly.

Moreover, decision unit 106 may compare the actual vehicle speed of the vehicle to a speed threshold wherein the speed threshold may be reflected as another differential. That is, decision unit 106 may determine whether or not to activate/deactivate the vehicle's collision prevention based upon relative speed. For example, decision unit 106 may only determine activation of the vehicle's collision prevention is warranted when the vehicle's actual vehicle speed is some percentage below the speed of traffic or a current speed limit, rather than an absolute minimum speed threshold. In other embodiments, decision unit 106 may base its decision on an absolute minimum speed threshold, e.g., if the vehicle is traveling below 25 miles per hour, decision unit 106 will determine that the vehicle's collision prevention should be activated.

It should be noted that in some embodiments, sensors 50 and/or V2X communications may be used to determine road conditions, such as road grade, weather, etc. as road conditions may impact the expected speed of the vehicle. For example, traveling up an incline may result in higher engine RPMs that when traveling flat roadway. In this case, road grade should be considered when comparing the vehicle's actual vehicle speed and expected speed. In some embodiments, the expected vehicle speed and engine RPM information may already be included in memory 106A. In other embodiments, this road conditions information may be received in real-time and used to update or "calibrate" the expected vehicle speed to engine RPM correlation. For example, upon a vehicle receiving V2X communications regarding road conditions, decision unit 106 may re-evaluate or adjust the correlation between expected vehicle speed and engine RPM. In determining whether or not to activate/deactivate the vehicle's collision prevention, the re-evaluated or adjusted correlation may be used by decision unit 106.

In the example illustrated in FIG. 1, magnetic system 110 include rear magnetic component 120 and front magnetic component 130. In some vehicles, a driver, operator, or passenger may be able to manually activate the vehicle's collision prevention by actuating at least one of rear magnetic component 120 and front magnetic component 130. Actuating rear magnetic component 120 may result in a control signal being sent to collision prevention component 102 instructing collision prevention component 102 to activate the vehicle's rear magnetic component. Similarly, collision prevention component 102 may send another control signal or relay the received control signal to front magnetic component 130. In various embodiments, the front magnetic component 130 and rear magnetic component 120 can include a solenoid. The solenoid may be made of nonmagnetic or magnetic materials. The amount of electrical current and the number of loops in the coil correspond to the strength of the magnetic field force. One of ordinary skill in the art will understand that a solenoid of magnetic material, such as iron, will yield a stronger magnetic force when activated.

In some embodiments, the front magnetic component 130 and rear magnetic component 120 may be surrounded with impact damping materials to mitigate the impact damage, should a collision occur. The impact damping material may be made of viscoelastic-like material and/or urethane-like material. A synthetic viscoelastic urethane polymer acts as liquid to absorb shock energy and convert the shock energy to a small amount of heat upon impact. The elastic and urethane elements allow the material to return to its original shape and sustain shock energy without easily breaking. In various embodiments where the impact damping material is present, the amount of current injected into the magnetic components to achieve a magnetic strength may need to be increased as magnetic forces may be weakened through larger amounts of elastic and urethane elements. One of ordinary skill in the art will understand that viscoelastic-like materials in combination with urethane-like materials, for example Sorbothane®, may reduce the intensity of the impact of a vehicle collision to alleviate damage. Moreover, Sorbothane® is a non-limiting example, and a person of ordinary skill in the art would know that any other similar type of viscoelastic-like materials and/or urethane-like materials may be used to help mitigate such impact damage.

In some embodiments, the vehicle may indicate to the driver, operator, or other passenger that the magnetic components 120, 130 are on by one or more of correspondingly flashing magnetic bumper indicators, displaying an indication on a display/head unit, etc. It should be understood that there may be multiple displays in the vehicle and the presentation of magnetic component activation may occur on different ones of these displays, e.g., a dashboard, a dashboard display, an instrument cluster, an instrument cluster display, a heads up display, etc. Moreover, it should be understood that a head unit can refer to a vehicle's "main" or "central" display, such as the display associated with the vehicle's entertainment system, navigation system, and the like.

In some embodiments, the rear magnetic component 120 and front magnetic component 130 may be manual switches. Automatic activation/deactivation of the vehicle's magnetic components, as well as automatic detection of a proximate obstacle, can be used as a backup or redundancy measure in such situations. Conversely, a manual override can be included to allow the driver to manually activate or deactivate the magnetic system 110 in various embodiments. The manual override could be included in the vehicle's head unit, a physical switch, or a combination of both.

Figure 2:
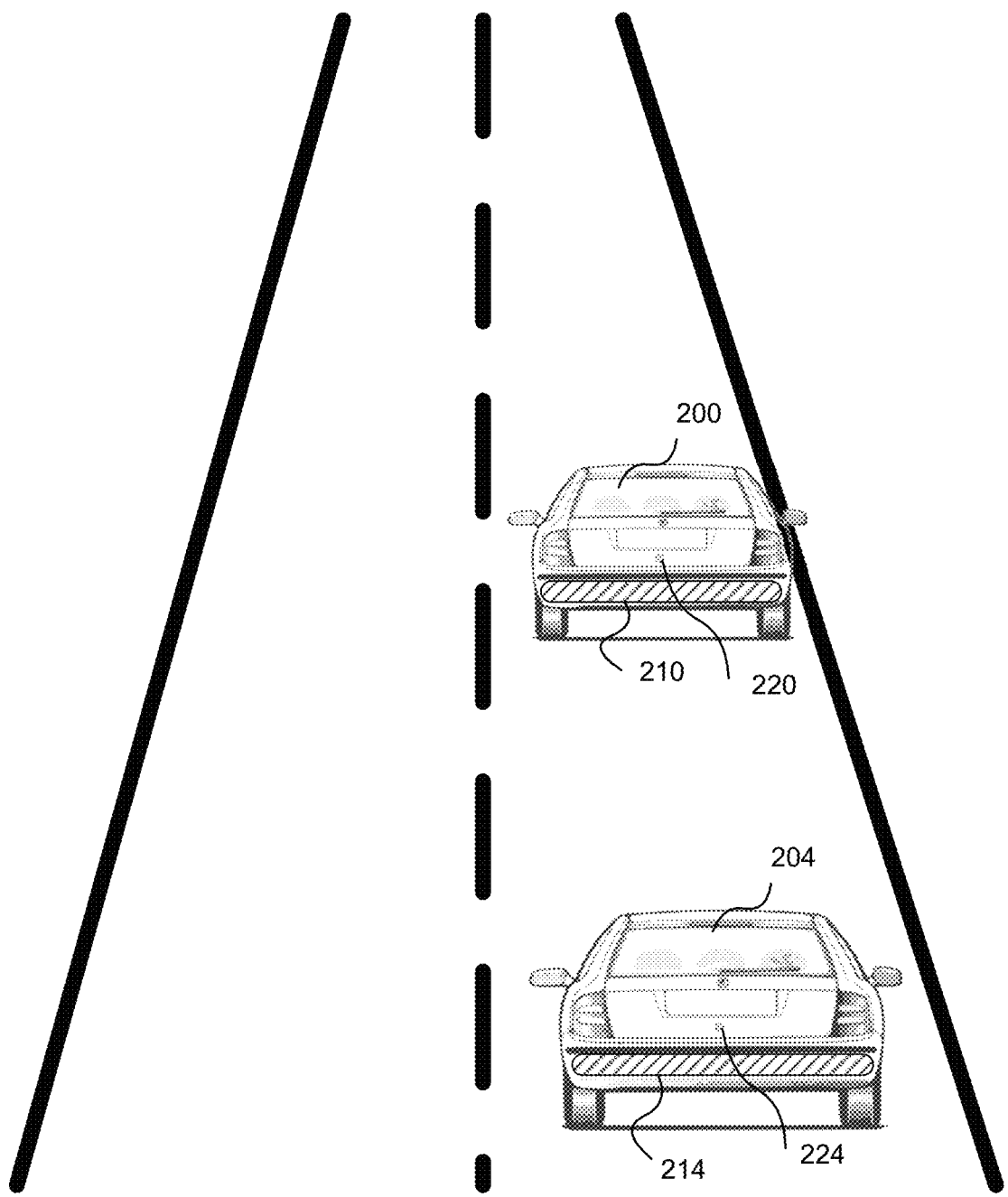
FIG. 2 illustrates an example scenario within a vehicle environment in accordance with various embodiments of the technology disclosed herein.
Figure 3:
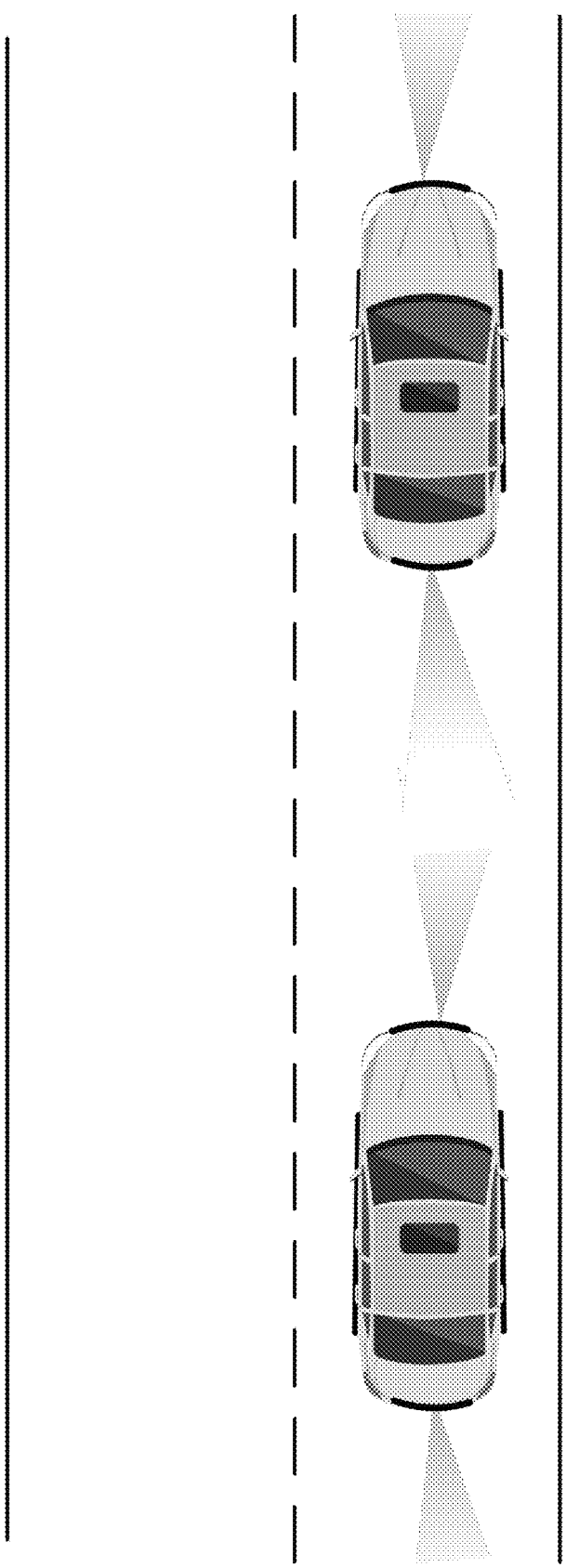
FIG. 3 illustrates an aerial view and sensor visualization of FIG. 2.

FIGS. 2 and 3 illustrate embodiments of the technology disclosed herein in a vehicle environment during which automatic activation/deactivation of a vehicle's magnetic component(s) might be beneficial to prevent and/or mitigate possible accidents or unsafe driving conditions with the use of imaging sensors near the rear and front bumpers of a vehicle. The various embodiments effectuating automatic magnetic component(s) operation may be described below with reference to these example scenarios. After reading this description, one of ordinary skill in the art will understand how systems and methods for automatic magnetic component operation may be implemented in other vehicle environments and/or may be useful in other environments.

FIG. 2 illustrates a scenario in which vehicles 200 and 204 are traveling along a roadway in accordance with embodiments of the present disclosure. Magnetic components 210 and 214 are operatively attached to the rear bumpers of vehicles 200 and 204, respectively, and may also be attached to the front bumpers of the vehicles (not illustrated). In this scenario, vehicles 200 and 204 may be traveling during the night or in a poorly-lit section of roadway. Vehicle 204 may be following vehicle 200, and traveling at a speed that is substantially faster that the speed at which vehicle 200 is traveling. Unless vehicle 200's rear lights are activated, given the dark or poorly-lit conditions, operator of vehicle 204 may not realize vehicle 200 is present and potentially rear-end vehicle 200, have to take evasive measures creating an unsafe situation, etc. Imaging sensors 220 and 224 are operatively attached to the rear of vehicle 200 and vehicle 204, respectively. It should be understood that similar sensors may also be operatively attached to the front of the vehicles. In an example embodiment, imaging sensor 220, and/or a similar imaging sensor attached to the front of vehicle 204, is able to detect when vehicle 204 meets the first threshold proximity relative to vehicle 200. In the case where imaging sensor 220 detects vehicle 204 meets the first threshold, magnetic component 220 will be signaled to activate a magnetic field with a first current from collision prevention system 102.

FIG. 3 illustrates an aerial view of the example illustrated in FIG. 2 in which the range of imaging sensors 220 and 224 and the placement of magnetic components 210 and 214 can be visualized for understanding as well as their counterparts on the fronts of the vehicles.

Figure 4:
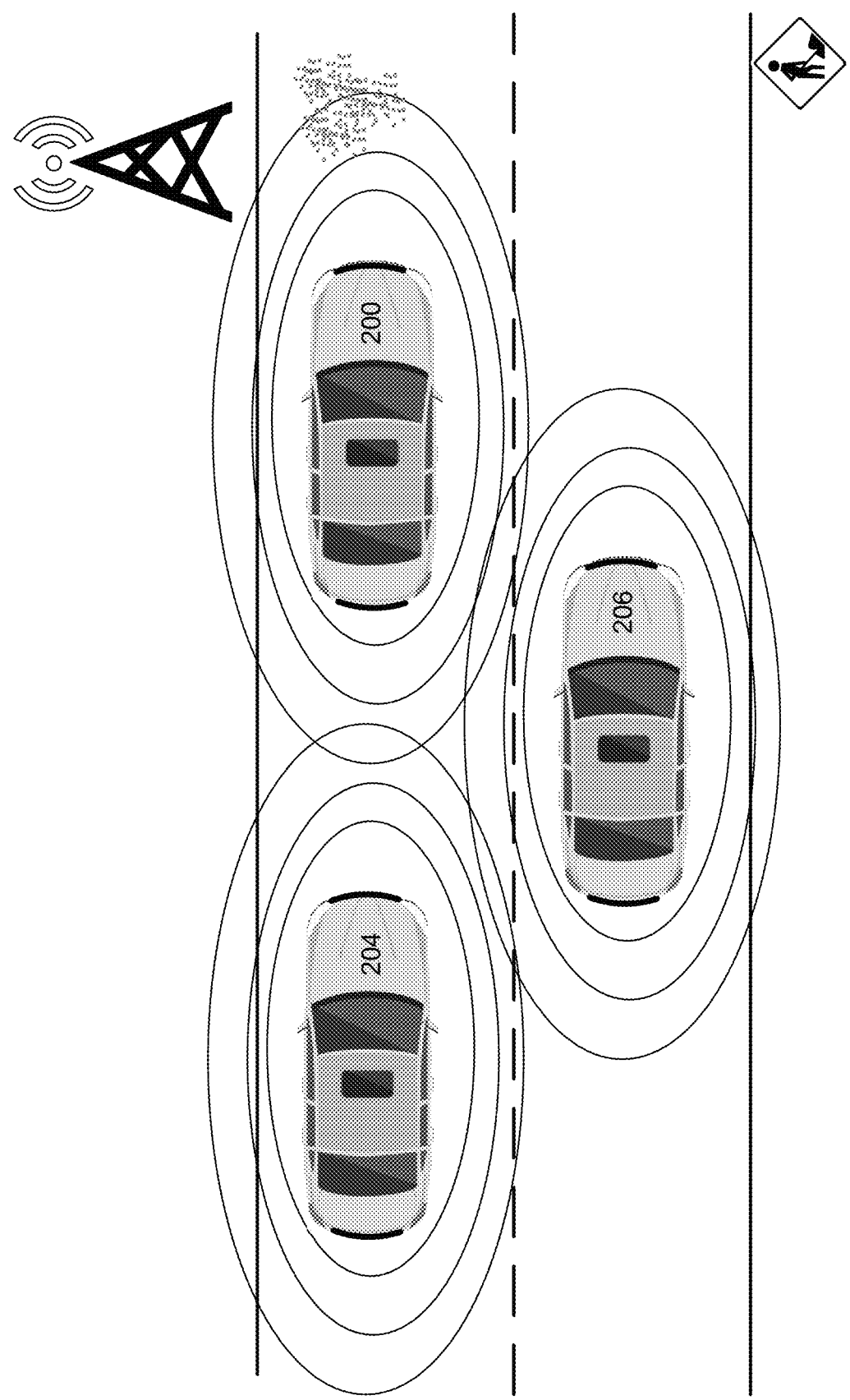
FIG. 4 illustrates an aerial view of another example scenario in accordance with the technology disclosed herein.

FIG. 4 illustrates another aerial view example in which vehicles 200, 204, and 206 are traveling along a roadway, in accordance with embodiments of the present disclosure. Vehicles 200, 204, and 206, in one scenario, may be an autonomous vehicle or a vehicle being operated in autonomous or driver-assisted mode. Accordingly, vehicles 200, 204, and 206 may be configured or programmed to sense hazardous or potentially unsafe conditions vis-à-vis V2X communications. In various embodiments, if vehicle 200 is initially traveling at a "normal" speed and suddenly brakes as approaching a poor quality road segment, vehicle 204 may not react to the deceleration quick enough and rear-end vehicle 200. This situation can be avoided by the automatic activation of rear magnetic component 120 of vehicle 200 and front magnetic component 130 of vehicle 204 upon receiving an update of road feature quality information ahead from V2I communication alone or in conjunction with information from sensors 50A-E. The impact damping material surrounding the magnetic components may also absorb some shock to lessen negative effects, should the vehicles come in contact. In various embodiments where impact damping material may not be installed and/or magnetic component activation fails to prevent vehicle contact in time, the magnetic component activation may still present partial polarity rejection and lessen vehicle collision impact. That is, even if the magnetic components may not have been activated in time to avoid absolute vehicle contact, magnetic components may have been activated in time to partially repel the other vehicle and lessen vehicle damage and/or passenger injury.

FIG. 4 further illustrates vehicles 200, 204 and 206 ability to sense obstacles, e.g. other vehicles, in proximity through V2X communications wherein rear-ending can be avoided by each vehicle knowing the distance of the others relative to itself.

FIG. 4 additionally illustrates that vehicle 206 can receive indication that a construction zone is approaching on its right side. This construction zone information received through V2X communications can be useful to slow down vehicle speed and activate magnetic component(s), wherein construction barricades may have permanent magnetic fields present to protect roadside workers.

Figure 5:
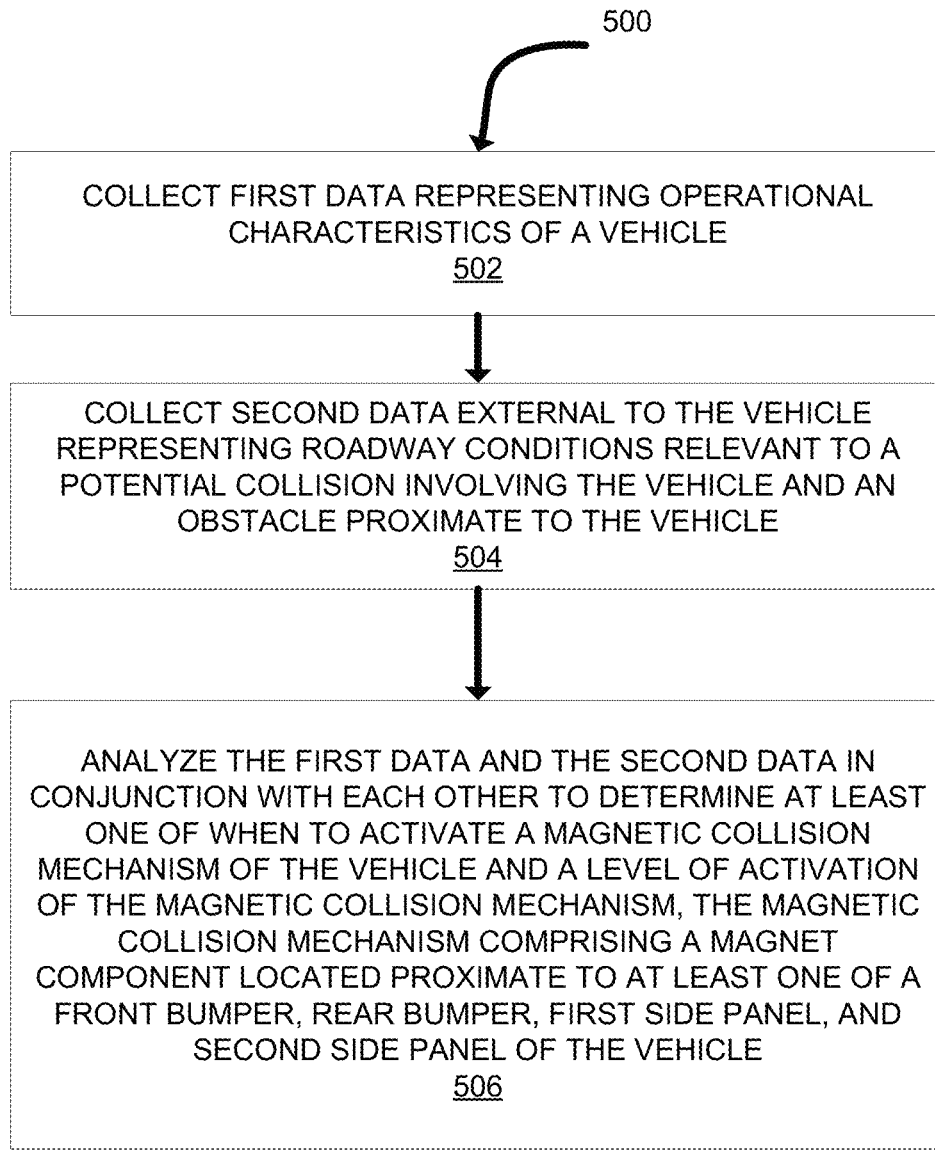
FIG. 5 is a flow chart illustrating example operations that can be performed to achieve automatic operation of collision prevention magnetic components in accordance with various embodiments of the present disclosure.

FIG. 5 is a flow chart illustrating method 500 that may be performed to automatically operate magnetic component(s) in accordance with embodiments of the present disclosure. At operation 502, the first data representing operational characteristics of the vehicle are collected. In some embodiments, operational characteristics may include vehicle speed, vehicle braking frequency, imaging, GPS location, and others. In some embodiments, the operational characteristics can be derived or calculated from data gathered by one or more sensors. For example, one or more sensors may determine the number of rotations of a wheel. From the number of wheel rotations over some time period and the size, e.g., circumference of the wheel, the distance traveled over that period of time can be determined. Because speed is a function of distance and time, speed of the vehicle can be derived. In some embodiments, a sensor, such as a GPS or other location-based sensor can determine the distance traveled by a vehicle over some time period. Again, given the distance traveled and the time taken to travel that distance, speed of the vehicle can be determined. Still other methods/mechanisms discussed above or known to those of ordinary skill in the art may be used to determine the vehicle's speed and relative distance to proximate obstacles.

At operation 504, the second data external to the vehicle representing roadway conditions is collected. These roadway conditions may be relevant to a potential collision involving the vehicle and an obstacle near the vehicle. As discussed above, these roadway conditions can be determined through V2X communications to provide indication of any oncoming traffic, construction zones, etc. where the magnetic component(s) may be needed. For example, average vehicle speed in a certain segment of a freeway almost immediately decreases by 25 MPH compared to the segment of the freeway two miles prior. This decrease in speed occurs daily at 5:30 PM. Vehicles possessing the collision prevention system will receive indication of the daily traffic conditions up ahead on its path and soon activate its magnetic component(s). Magnetic component(s) and impact damping material in this situation can be useful while decelerating as there is potential of getting rear-end in addition to during the stop-go traffic segment of the freeway.

At operation 506, an analysis is made between the first data and the second data. The analysis may advise when to activate and how much current should flow to the magnetic component(s). Depending on the speed of the vehicle and the proximity of the obstacle/vehicle, a time and amount of current is activated. A time and amount of current may also be determined by operatively attached imaging sensors to at least one of the front and rear bumpers of the vehicle. In some embodiments, multiple comparisons can be made to provide redundancy and/or provide a way to verify another method's determination. Those of ordinary skill in the art will understand there are a variety of ways to set and/or use speed of the vehicle as a basis for determining whether to activate or deactivate a vehicle's magnetic components.

Although the technology of the present disclosure has been discussed with respect to embodiments within vehicle environments, it should be noted that the technology has other applications/uses in other environments. That is, certain operating conditions within a system, within a particular operating environment, and the like can be sensed. Information obtained through such sensing may be used to control when a magnetic field or force is applied and/or how strong that magnetic field or force should be. For example, an electromagnetic sweeper system can implement a magnetic component similar to the magnetic component discussed above with respect to FIGS. 1-5. One or more sensors can identify various categories of objects based on a variety of characteristics, such as size, type of metal, etc. The electromagnetic sweeper system can then determine the required strength of a magnetic field to repel and/or attract different objects.

Another applicable environment for the technology disclosed herein is an electromagnetic locking system. Sensors can collect data used to determine a person or persons approaching a door or other access point. For example, the electromagnetic locking system can be implemented near a door or gate of access. Motion, facial recognition, a license plate number, among other data may be collected by a variety of sensors. In some embodiments, the electromagnetic locking system may communicate with mobile transmitters, such as an identity token, smartphone, car keys, or other devices, similar to the V2I communication discussed above with respect to FIGS. 1-5. The electromagnetic locking system can utilize the sensed information to make a determination whether to lock or unlock the access point. For example, if an unknown individual is approaching, the electromagnetic locking system can send a signal to one or more magnetic components to engage one or more locks, ensuring no access. For known individuals, the electromagnetic locking system can send a signal to disengage one or more locks, allowing the individual to enter the access point without the need to interact with any locking mechanisms. Different strengths of magnetic field may be needed for activating/deactivating different parts of the locking mechanism, for example, a strong part of the locking mechanism may be deactivate with the system upon sensing, but a lower level locking mechanism stays in tack that must be deactivated/unlocked in a different way, e.g. a key. Although discussed with respect to building access points, such an electromagnetic locking mechanism is applicable in any environment where physical latches are implemented, including but not limited to automotive vehicles.

As another example, an air circulation system can include an electromagnetic torque coupler. The electromagnetic torque coupler can assist rotational activation of fans after sensing a high temperature, poor air quality or the like. The extremity of the temperature or air quality may signal different strengths of current to be injected into the electromagnet, hence controlling the speed of the circulation.

While various embodiments of the disclosed technology have been described above, it should be understood that they have been presented by way of example only, and not of limitation. Collision prevention systems can be implemented in any context that wishes to avoid low impact collisions of any sort. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
    collecting a first data representing operational characteristics of a vehicle;
    collecting a second data external to the vehicle;
    comparing each of the first and second data to respective first and second thresholds, and against each other for validation when the first and second data correspond to the same operational characteristics of the vehicle; and
    analyzing the first data and the second data in conjunction with each other to determine at least one of when to activate a magnetic collision mechanism of the vehicle and a level of activation of the magnetic collision mechanism, the magnetic collision mechanism comprising a magnet component located proximate to at least one of a front bumper, rear bumper, first side panel, and second side panel of the vehicle.

2. The method of claim 1, wherein collecting the first data representing operational characteristics of the vehicle comprises collecting at least one of: a speed of the vehicle; and braking frequency of the vehicle.

3. The method of claim 1, wherein collecting the second data comprises collecting roadway conditions via vehicle-to-infrastructure (V2I), vehicle-to-vehicle (V2V) communications, or a combination of both.

4. The method of claim 3, wherein the second data external to the vehicle comprises at least one of:
    current traffic condition information;
    one or more obstacles preceding a current location of the vehicle;
    road feature quality information;
    construction zone information;
    daily traffic condition information;
    and seasonal traffic condition information.

5. The method of claim 1, wherein collecting the first data further comprises:
    collecting the operational characteristics of the vehicle from one or more sensors operatively attached to at least one of: a front bumper of the vehicle; a rear bumper of the vehicle; and a side panel of the vehicle; and
    wherein the operational characteristics include a distance between at least one of the front bumper and the rear bumper of the vehicle and an obstacle, the obstacle comprising a second vehicle having at least one of a front bumper or a rear bumper.

6. The method of claim 5, further comprising analyzing a distance between at the front bumper of the vehicle and the rear bumper of the second vehicle, or the rear bumper of the vehicle and the front bumper of the second vehicle, and determining if the distance meets the first threshold.

7. The method of claim 1, wherein collecting the second data external to the vehicle comprises collecting information indicative of a distance between the vehicle and an obstacle via vehicle-to-vehicle (V2V) communication, the obstacle comprising a second vehicle having at least one of a front bumper or a rear bumper, the distance comprising distance between the front bumper of the vehicle and the rear bumper of the second vehicle, or the rear bumper of the vehicle and the front bumper of the second vehicle.

8. The method of claim 7, further comprising analyzing the distance between the front bumper of the vehicle and the rear bumper of the second vehicle, or the rear bumper of the vehicle and the front bumper of the second vehicle, and determining if the distance meets the second threshold.

9. The method of claim 1, wherein analyzing the first data and the second data in conjunction with each other comprises:
    determining a time at which to activate the magnet component;
    determining an amount of current to flow into the magnet component to achieve a desired magnetic strength, the magnet component comprising an electromagnet; and
    generating a signal to activate the magnet component of the magnetic collision mechanism with the determined amount of current.

10. A collision prevention system, comprising:
    a data interface, wherein the data interface collects data including at least one of a current speed of a vehicle, acceleration and deceleration of the vehicle, and braking frequency and intensity of the vehicle obtained from one or more sensors coupled to the vehicle and from one or more sensors external to the vehicle;
    a decision unit, comprising:
        a processor; and
        a memory unit operatively connected to the processor, wherein the memory stores instructions causing the processor to:
            compare the current speed, acceleration and deceleration, and braking frequency and intensity of the vehicle to a respective plurality of thresholds, and compare the current speed, acceleration and deceleration, and braking frequency and intensity of the vehicle obtained from the one or more sensors coupled to the vehicle and the current speed, acceleration and deceleration, and braking frequency and intensity of the vehicle obtained from the one or more sensors external to the vehicle to validate the current speed, acceleration and deceleration, and braking frequency and intensity of the vehicle;
            analyze the validated current speed, acceleration and deceleration, and braking frequency and intensity of the vehicle;
            determine, based on the analysis of the validated current speed, acceleration and deceleration, and braking frequency and intensity of the vehicle, a time to activate the collision prevention system, and a level of activation of the collision prevention system, the collision prevention system including an electromagnetic component; and
            generate a signal to activate the electromagnetic component at the determined time, the signal including an indication of an amount of current to be injected into the electromagnetic component to achieve the determined level of activation.

11. The system of claim 10, wherein the level of activation comprises a strength of a magnetic field resulting from the injection of the current into the electromagnetic component.

12. The system of claim 10, wherein the decision unit obtains the data from the data interface.

13. The system of claim 10, wherein the memory unit further comprises the plurality of thresholds, wherein if one or more of the plurality of thresholds is met, the electromagnetic component is signaled to be activated or deactivated accordingly.

14. The system of claim 10, wherein the signal activating the electromagnetic components comprises injecting an electrical current into a solenoid, the solenoid being a cylindrical coil of wire, wherein the solenoid may be magnetic, nonmagnetic, or other materials.

15. A system to electromagnetically control a mechanism, comprising:
    one or more sensors configured to sense environmental features;
    a decision unit, communicatively connected to the one or more sensors via a data interface, wherein the data interface collects the sensed environmental features from the one or more sensors, comprising:
    a processor; and
    a memory unit operatively connected to the processor, wherein the memory unit stores instructions causing the processor to:
        validate the sensed environmental features by comparing the sensed environmental features with corresponding thresholds and, when the sensed environmental features are sensed from two or more sensors, comparing the sensed environmental features from each of the two or more sensors;
        analyze the sensed environmental features;
        determine, based on the analysis, a time to activate/deactivate the system, and a level of activation/deactivation of the mechanism; and
        generate a signal to accordingly activate/deactivate the one or more electromagnetic components at the determined time, the signal including an indication of an amount of current to achieve the determined level of activation/deactivation.

* * * * *